United States Patent
Crothers et al.

(10) Patent No.: US 7,983,790 B2
(45) Date of Patent: Jul. 19, 2011

(54) COMPONENT REPAIR USING REVERSE ENGINEERING

(75) Inventors: Phillip John Crothers, Hampton East (AU); Robert Coulter Fraser, Melbourne (AU)

(73) Assignee: The Boeing Company, Chicago, IL (US)

( * ) Notice: Subject to any disclaimer, the term of this patent is extended or adjusted under 35 U.S.C. 154(b) by 311 days.

(21) Appl. No.: 12/339,689

(22) Filed: Dec. 19, 2008

(65) Prior Publication Data

US 2010/0161100 A1     Jun. 24, 2010

(51) Int. Cl.
    *G06F 19/00*     (2006.01)
(52) U.S. Cl. ........ 700/195; 700/160; 700/186; 700/193; 700/250; 700/253; 700/260; 33/503; 33/504; 33/544.4; 33/556; 901/34; 901/41; 901/44
(58) Field of Classification Search .......... 700/105, 700/186, 253, 295, 250, 258, 260; 33/503–504; 901/34, 44, 41
See application file for complete search history.

(56) References Cited

U.S. PATENT DOCUMENTS

| | | | | |
|---|---|---|---|---|
| 4,317,644 A * | 3/1982 | Hosoi | ............................. | 409/98 |
| 4,562,392 A * | 12/1985 | Davis et al. | ................... | 318/572 |
| 5,139,376 A * | 8/1992 | Pumphrey | .................... | 408/1 R |
| 5,446,673 A | 8/1995 | Bauer | | |
| 5,724,264 A * | 3/1998 | Rosenberg et al. | ........... | 702/152 |
| 6,243,621 B1 * | 6/2001 | Tao et al. | ...................... | 700/245 |
| 7,126,329 B2 * | 10/2006 | Ruzzo et al. | ................... | 324/239 |
| 7,174,651 B2 * | 2/2007 | Raab et al. | ....................... | 33/503 |
| 7,204,033 B2 * | 4/2007 | Mies | ................................. | 33/556 |
| 7,283,889 B2 * | 10/2007 | Otsuki et al. | ................... | 700/186 |
| 7,340,323 B2 * | 3/2008 | Zhang et al. | ................... | 700/260 |
| 7,448,271 B2 * | 11/2008 | Duncan et al. | ................... | 73/634 |
| 2004/0254677 A1 * | 12/2004 | Brogardh et al. | ............. | 700/245 |
| 2007/0050064 A1 | 3/2007 | Burgess et al. | | |
| 2008/0235970 A1 * | 10/2008 | Crampton | ....................... | 33/503 |
| 2009/0029631 A1 * | 1/2009 | Offer et al. | ....................... | 451/28 |
| 2010/0023157 A1 * | 1/2010 | Burgess et al. | ............... | 700/186 |

FOREIGN PATENT DOCUMENTS

| | | |
|---|---|---|
| DE | 10131228 A1 | 3/2002 |
| EP | 1129813 A1 | 9/2001 |
| WO | 2006024844 A2 | 3/2006 |

OTHER PUBLICATIONS

Renishaw, "TS27R tool setting probe", 2002, pp. 1-2.*
www.robotroom.com, "DC motor driver H-bridge circuit", pp. 1-9, 2000.*
Marposs, "E88 touch system", pp. 1-4, 2000.*
U.S. Appl. No. 12/339,560, filed Dec. 19, 2008, Crothers.
PCT Search report for application PCT/2009/068696 dated Jun. 8, 2010.
PCT Search report for application PCT/2009/068836 dated Jun. 8, 2010.

* cited by examiner

*Primary Examiner* — Albert Decady
*Assistant Examiner* — Olvin Lopez
(74) *Attorney, Agent, or Firm* — Yee & Associates, P.C.

(57) ABSTRACT

A method for modifying a component may comprise measuring the component using a modifying tool, and recording position data for the component based on the measuring. A path for the modifying tool may be provided using the position data, and the component may be modified by moving the same modifying tool based on the provided path.

23 Claims, 7 Drawing Sheets

# COMPONENT REPAIR USING REVERSE ENGINEERING

BACKGROUND INFORMATION

1. Field

The present disclosure relates generally to component modification and, in particular, to a method and apparatus for modifying aircraft components. Still more particularly, the present disclosure relates to a method and apparatus for reworking an aircraft component formed of composite material by using a robot/machine to reverse engineer the component and then using the same robot/machine to rework the component.

2. Background

With composite materials becoming increasingly prevalent in the manufacture of aircraft components, for example and without limitation, wing and fuselage components, the need to be able to efficiently rework out of tolerance areas on such components is growing accordingly. Reworking a surface of a composite material may require that a scarf machining operation, e.g. a grinding or sanding operation, be performed to prepare the surface for rework.

Reworking components formed of composite material, for example and without limitation, scarf machining components formed of composite material, is usually performed by skilled labor using a substantially manual procedure. The procedure can take many hours and requires a high degree of skill due to the complexity of the geometries of typical components being reworked and because of the extreme accuracy that is usually required.

Furthermore, the use of manual labor to rework components formed of composite materials may create challenges due to both carbon dust that may be produced during the rework procedure and loads that may be induced on the component during the scarf machining operation. Yet further, the size of the existing skilled workforce may not be sufficient when composite aircraft currently being manufactured reach the market and require servicing.

Therefore, it would be advantageous to have a method and apparatus that overcomes the above issues in reworking or otherwise modifying components formed of composite material.

SUMMARY

In one advantageous embodiment, a method for modifying a component may include measuring the component using a modifying tool. Position data for the component may be recorded based on the measuring. A path for the modifying tool may be provided using the position data, and the component may be modified by moving the same modifying tool based on the provided path.

In another advantageous embodiment, a method for modifying a component formed of composite material may comprise measuring a surface of the component to be modified using a modifying tool. Position data for the surface may be recorded based on the measuring. A path for the modifying tool may be provided using the position data, and the surface of the component may be modified by moving the same modifying tool based on the provided path.

In yet another advantageous embodiment, an apparatus for modifying a component may comprise a modifying tool for measuring the component. A controller may provide a path for the modifying tool to modify the component based on the measuring. A driver may move the same modifying tool along the provided path for modifying the component.

In yet another advantageous embodiment, a computer program product comprises a computer recordable medium storing computer usable program code for modifying a component. The computer program product may comprise computer usable program code for measuring the component using a modifying tool. The computer program product may also comprise computer usable program code for recording position data for the component based on the measuring, and computer usable program code for providing a path for the modifying tool using the position data. The computer program product may also comprise computer usable program code for modifying the component by moving the same modifying tool based on the provided path.

In yet another advantageous embodiment, an apparatus for modifying a component may comprise a robot having a robot arm. The apparatus may also comprise a measuring tool on the robot arm for measuring a surface of the component to provide surface measurements, and a machining tool on the robot arm for machining the surface of the component. The apparatus may also comprise a controller for receiving the surface measurements and for providing a path for the machining tool to modify the component based on the surface measurements, and a robot driver for moving the machining tool on the provided path for modifying the component. The measuring tool may comprises a sleeve that surrounds the machining tool during measuring of the surface of the component, and which has a contact tip positioned at a fixed position with respect to a contact tip of the machining tool when the measuring tool surrounds the machining tool. The measuring tool may be removed from the robot arm to expose the machining tool during modifying of the component.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
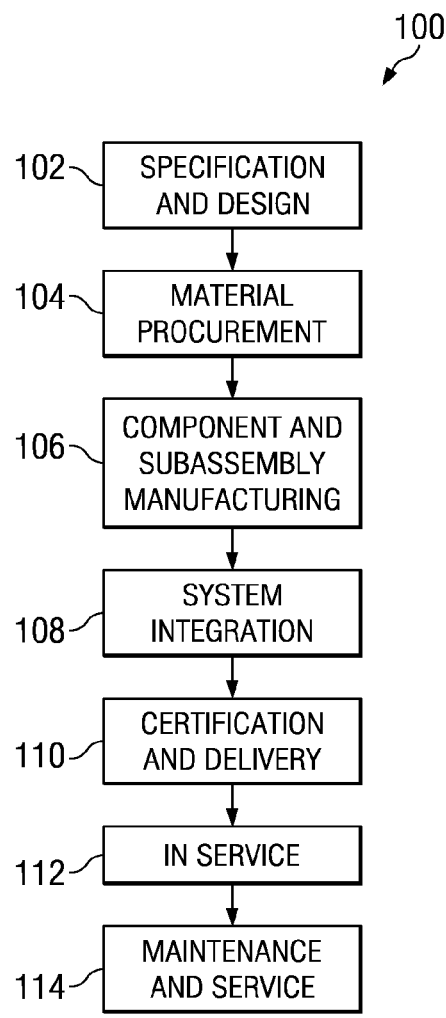
FIG. 1 is a diagram illustrating an aircraft manufacturing and service method in which an advantageous embodiment may be implemented.
Figure 2:
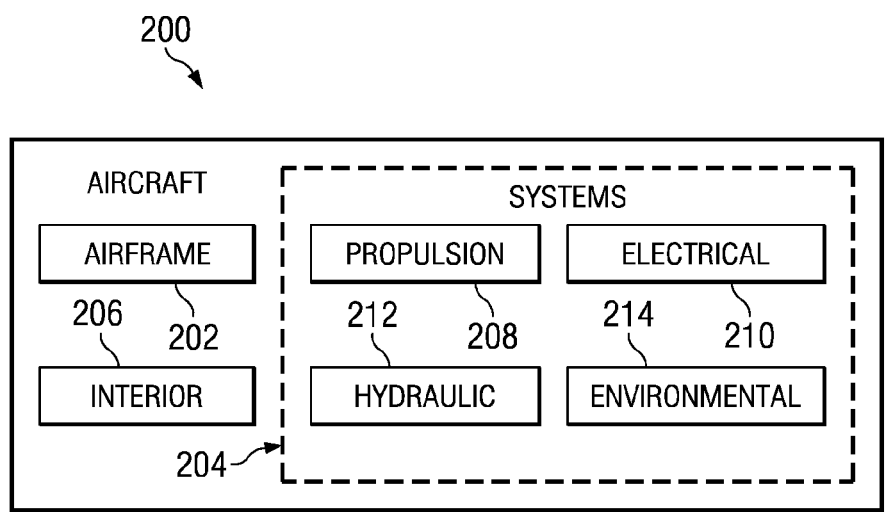
FIG. 2 is a diagram of an aircraft in accordance with an advantageous embodiment.

Referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is subject to maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200.

Similarly, one or more of apparatus embodiments, method embodiments, or a combination thereof may be utilized while aircraft 200 is in service, for example, without limitation, during maintenance and service 114. As a specific example, an advantageous embodiment may be implemented during maintenance and service 114 to repair an aircraft component formed of composite material.

In order to properly rework or otherwise modify a surface of a component, it is necessary to know the profile of the surface (surface geometry) to a sufficient accuracy to enable the modification to be accurately performed. If the surface is measured with a standard reverse engineering technique, for example, by using a laser tracker, scanner or measurement arm, it may be very difficult to minimize errors and the time needed to translate the measurements to a machine that performs the modification.

When the modification is a scarfing operation to rework a surface of an aircraft component formed of composite material, the accuracy and quality of the operation must be especially precise.

The different advantageous embodiments recognize that errors may be minimized by using the same tool to both measure a surface to be modified and to modify the surface. Errors may be minimized because the tool configuration during the modifying will be similar to the tool configuration when the tool measured the surface. If measurements are performed by a different tool than the tool that performs the modifying, errors will invariably be larger because the separate tools will have different uncertainty characteristics.

The different advantageous embodiments recognize and take into account the use of force control to allow the minimization of errors in a component modification operation. In particular, force control is used to achieve a steady and consistent contact force against a surface of a component being measured by a tool as the tool is moved over the surface for reverse engineering the component, and then the reverse engineering is used to create an advantageous path for modification of the component by the same tool that performed the measuring.

Figure 3:
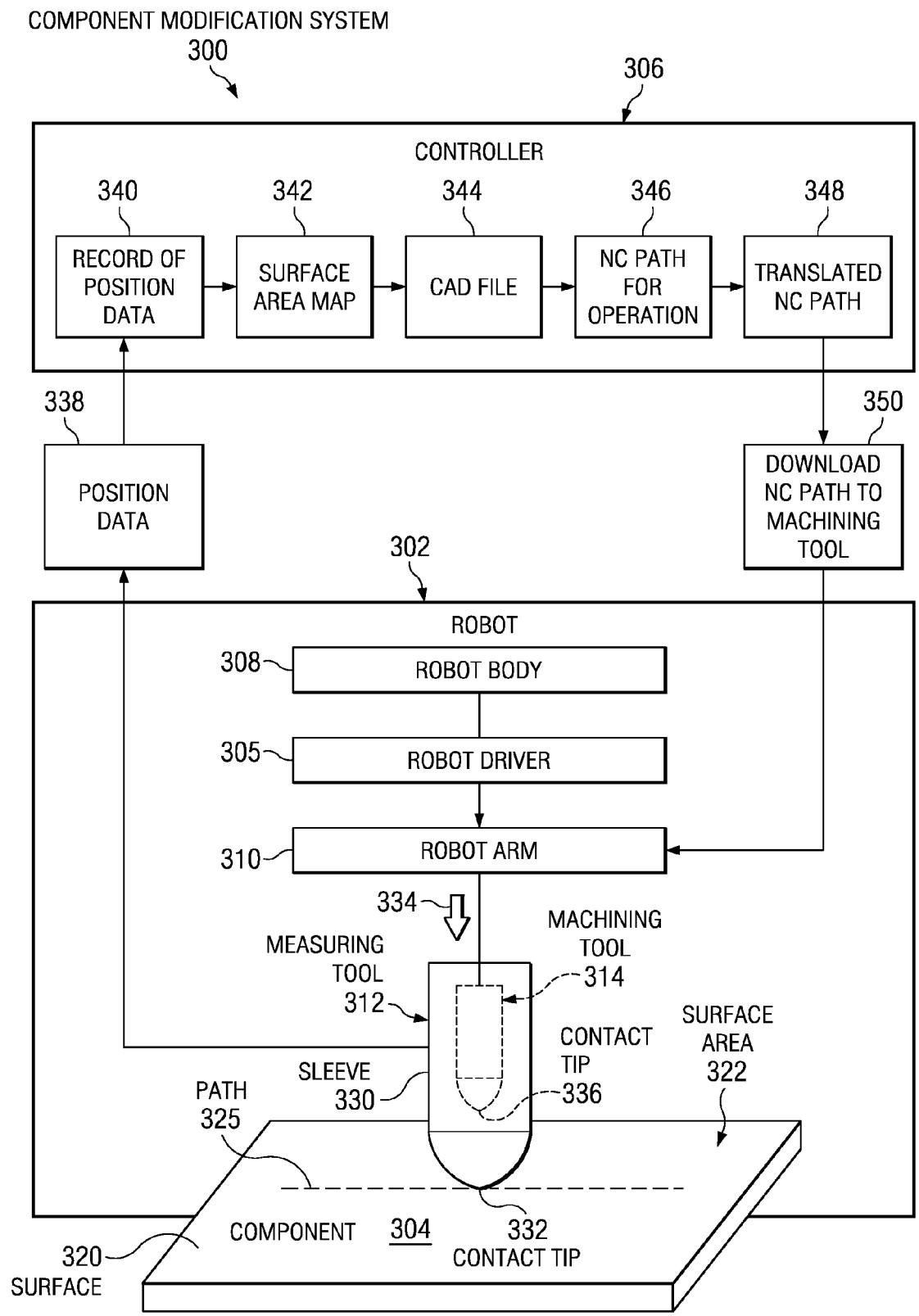
FIG. 3 is a block diagram illustrating a component modification system in accordance with an advantageous embodiment.

With reference now to FIG. 3, a block diagram illustrating a component modification system is depicted in accordance with an advantageous embodiment. In this example, the component modification system is designated by reference number 300, and generally includes a modifying tool 302 for modifying a component such as component 304, and a controller 306 for controlling the operation of modifying tool 302. In the advantageous embodiment illustrated in FIG. 3, modifying tool 302 is implemented as robot 302 to rework a damaged area on a surface 320 of component 304. The term "rework" as used herein may be defined as bringing an out of tolerance condition within tolerance using a component modification system.

Robot 302 includes robot body 308 supporting robot arm 310. Robot arm 310 is capable of movement along multiple axes, for example, five or six axes, via a robot driver mechanism 305 controlled by controller 306, and carries measuring tool 312 and machining tool 314 at an outer end thereof.

Machining tool 314 may be any appropriate tool for performing a desired operation on component 304. In one advantageous embodiment, component 304 may be a component formed of composite material, for example, a component of an aircraft, and machining tool 314 may be a scarfing tool for performing a scarfing operation, for example, a grinding or sanding operation, on an area of surface 320 of component 304 requiring rework, for example, surface area 322. According to other advantageous embodiments, machining tool 314 may be a tool for performing other types of modifications to component 304 such as applying or removing paint or another coating or ply on surface 320 of the component.

Measuring tool 312 measures a current profile of component 304 using force control. In particular, robot arm 310 is controlled via robot driver 305 to move measuring tool 312 over surface 320 of component 304 being measured along a path 325 with a contact force that is maintained steady and consistent during measuring regardless of the position of the measuring tool on the surface 320 of the component 304. According to advantageous embodiments of the disclosure, measuring tool 312 comprises a removably mounted sleeve 330 positioned to surround machining tool 314 (machining tool 314 is shown in dotted line in FIG. 3). Sleeve 330 may have a contact tip 332 at the end thereof which is adapted to be maintained in contact with surface area 322 of component 304 to measure the surface geometry of area 322 via force control in a force direction generally designated by arrow 334. Contact tip 332 of sleeve 330 may be a hemisphere-shaped tip positioned such that the focus of curvature of the hemisphere is on contact tip 336 of machining tool 314 when sleeve 330 is mounted to surround the machining tool.

As robot arm 310 is moved by robot driver 305 to cause sleeve 330 to follow the surface profile of surface area 322 of component 304, with tip 332 of sleeve 330 in force contact with the component surface via force control 334, the path 325 followed by the sleeve may be detected by the measuring tool 312. In particular, position data 338 representing the position of the sleeve 330 may be periodically measured as the sleeve 330 is moved over surface area 322 of component 304, and the position data 338 is recorded in controller 306 to form position data record 340. A map 342 of surface area 322 may then be created from the position data, and the map may be used to modify a CAD file 344 to allow for a desired numerically controlled (NC) path 346 to be created for operating the machining tool to modify the surface area 322 of component 304. The NC path may be translated into robot language as shown at 348. The translated NC path may then be downloaded to the robot as shown at 350 to control the movement of the robot arm 310 and, hence, to control the movement of machining tool 314 via robot driver 305.

Sleeve 330 has a contact tip 332, which may be of hemispherical shape, that is adapted to contact the surface 320 of the component 304 being machined during a measuring process. When the sleeve 330 is mounted to the robot arm 310 to surround machining tool 314, the focus of curvature of the hemisphere of contact tip 332 is on the contact tip 336 of the machining tool 314. Thus, the contact tip 332 on the measuring tool may always be related back to the contact tip 336 of the machining tool 314—the tool center point (TCP) 360.

Figure 4:
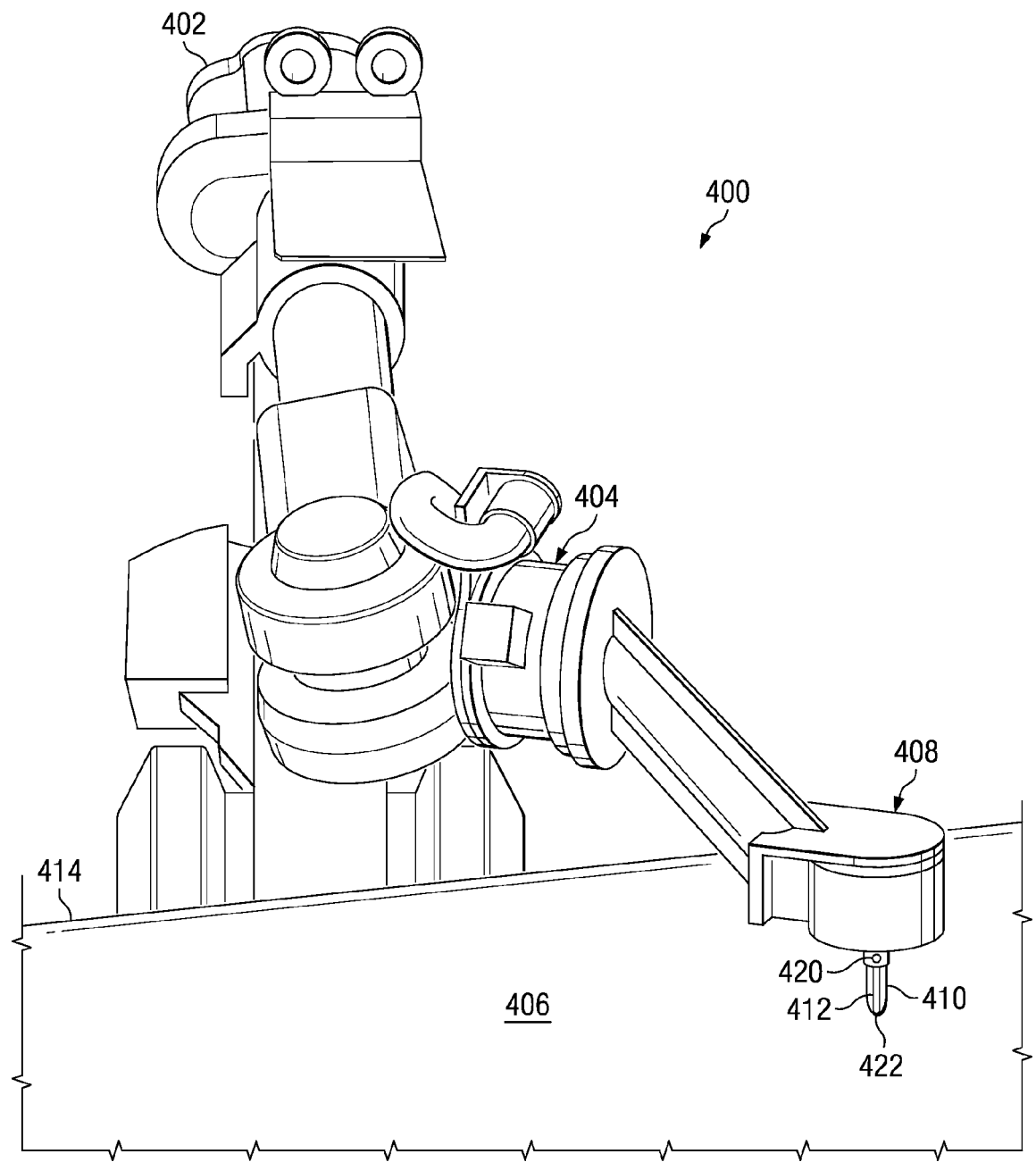
FIG. 4 is a diagram illustrating a modifying tool in accordance with an advantageous embodiment.

With reference now to FIG. 4, a diagram illustrating a modifying tool is depicted in accordance with an advantageous embodiment. In this example, modifying tool 400 is implemented as robot 400 and is an example of one implementation of robot 302 in FIG. 3. In this example, robot 400 includes robot body 402, and robot arm 404. Robot 400 may be a free-standing structure positioned adjacent a component 406 to be reworked or otherwise modified, as shown in FIG. 4, or robot body 402 may be mounted directly to the component via suction cups, straps or another mounting mechanism. Component 406 to be reworked is an example of one implementation of component 304 in FIG. 3.

FIG. 4 illustrates a measuring tool 410 and a machining tool 412 mounted to end 408 of robot arm 404. Measuring tool 410 is an example of one implementation of measuring tool 312 in FIG. 3, and machining tool 412 is an example of one implementation of machining tool 314 in FIG. 3. According to the advantageous embodiment illustrated in FIG. 4, measuring tool 410 is adapted to be removably attached to end 408 of robot arm 404 during a measuring process, for example, by a grub screw 420 which clamps the side of the machining tool, or by another attachment mechanism, and then removed to expose machining tool 412 for a machining process. FIG. 4 illustrates robot arm 404 positioned to cause contact tip 422 of measuring tool 410 to contact surface 414 of component 406 during a measuring process.

In an advantageous embodiment, component 406 comprises a component formed of composite material, for example a component of an aircraft, and machining tool 412 comprises a scarfing tool. In other advantageous embodiments, machining tool can be any kind of tool for performing numerous types of modifications to any kind of component, including, for example, paint applying or removal, coating, polishing and so forth.

Figure 5A:
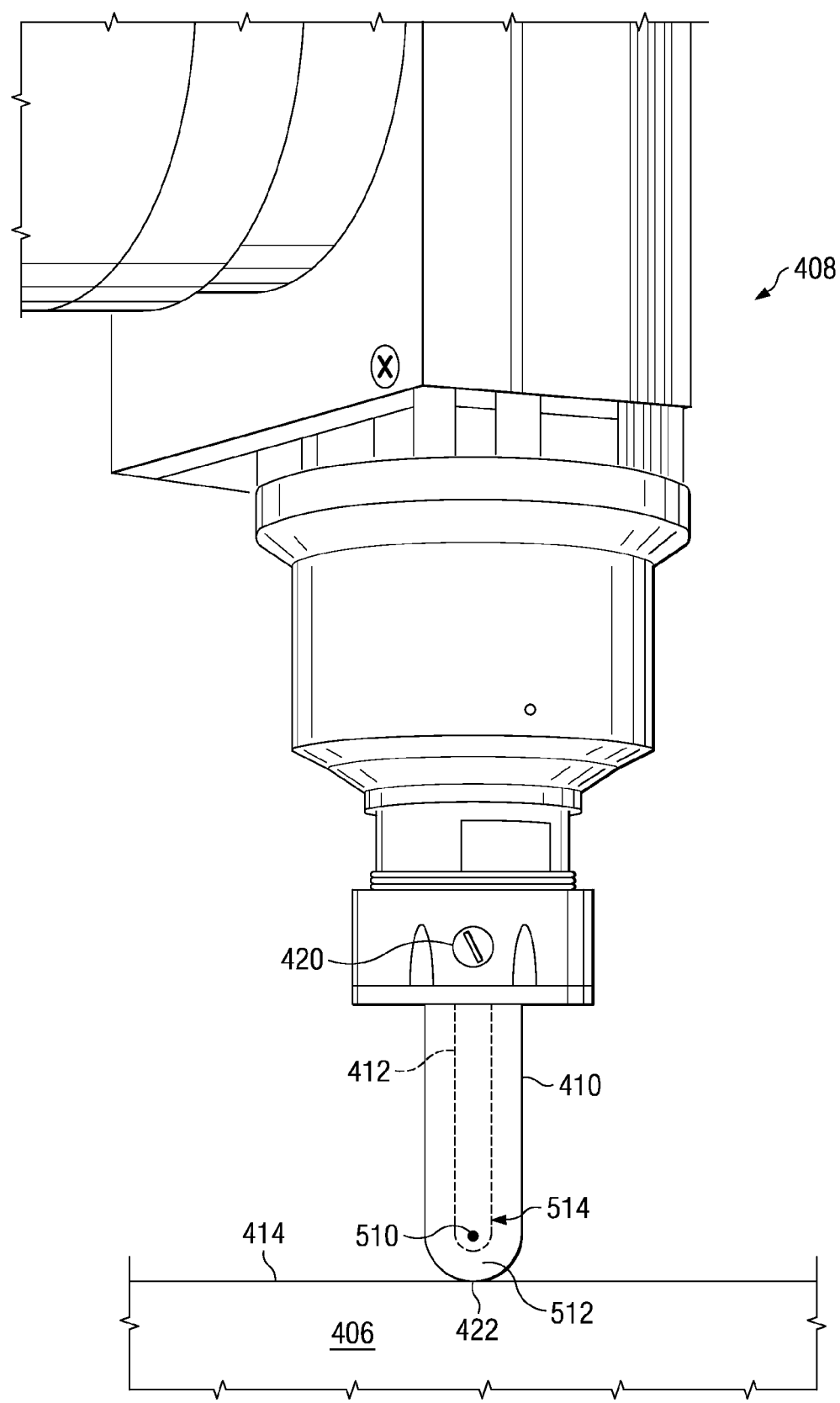
FIG. 5A is a diagram illustrating a measuring tool of the modifying tool of FIG. 4 in accordance with an advantageous embodiment.
Figure 5B:
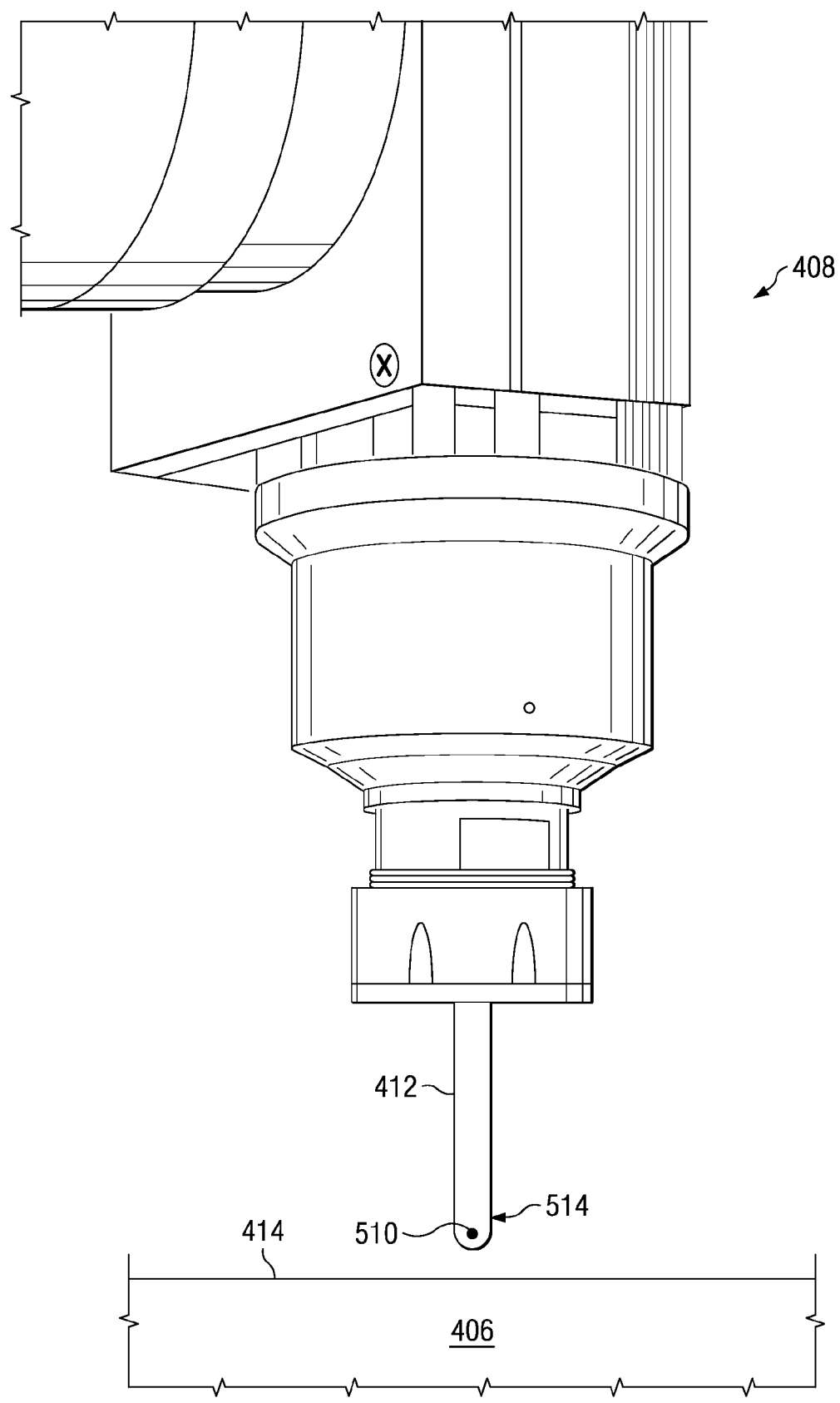
FIG. 5B is a diagram illustrating a machining tool of the modifying tool of FIG. 4 in accordance with an advantageous embodiment.

Turning now to FIGS. 5A and 5B, FIG. 5A is a diagram illustrating a measuring tool of the modifying tool of FIG. 4 in accordance with an advantageous embodiment, and FIG. 5B is a diagram illustrating a machining tool of the modifying tool of FIG. 4 in accordance with an advantageous embodiment. In particular, FIG. 5A is an enlarged view of the end 408 of robot arm 404 in FIG. 4, and FIG. 5B is an enlarged view of the end 408 of robot arm 404 with the measuring tool 410 removed so as to expose machining tool 412 for a machining process.

As shown in FIG. 5A, measuring tool 410 comprises a sleeve that surrounds machining tool 412 when attached to the end 408 of the robot arm. Sleeve 410 may have a hemisphere-shaped contact tip 422 which is adapted to be in force contact with surface 414 of component 406 during a measurement process. The focus of curvature 510 of the hemisphere 512 is on the contact tip 514 of the machining tool 412 that is surrounded by sleeve 410. Thus, the contact tip 422 of the hemisphere 512, and hence of the measuring tool 410, can always be related back to the contact tip (TCP) 514 of machining tool 412.

Sleeve 410 may be formed of metal or another material selected so as to not mar and/or scratch the surface being measured and to maintain its shape. The amount of force used to measure the surface should be less than will mar and/or scratch the component, but sufficient to ensure that contact is maintained with the surface during a measuring operation, i.e., no bouncing or drifting from the surface due to the force being too small. According to an advantageous embodiment, the amount of force used to measure the surface may be from about 5 to about 20 Newtons.

After a measuring process has been completed, the measuring tool 410 may be removed to expose machining tool 412 for a machining process as illustrated in FIG. 5B. The robot arm may then be operated to move machining tool 412 with respect to surface 414 of component 406 to rework or otherwise modify the surface. Because the contact tip 514 of the machining tool can be related to the contact tip 422 of the measuring tool, and because the robot itself is maintained in alignment with the component, either by not being moved relative to the component, or if moved, by being realigned with the component, the measurements made by the measuring tool can be used to design a path, for example and without limitation, path 325 in FIG. 3, for the machining tool to precisely modify the component.

Figure 6:
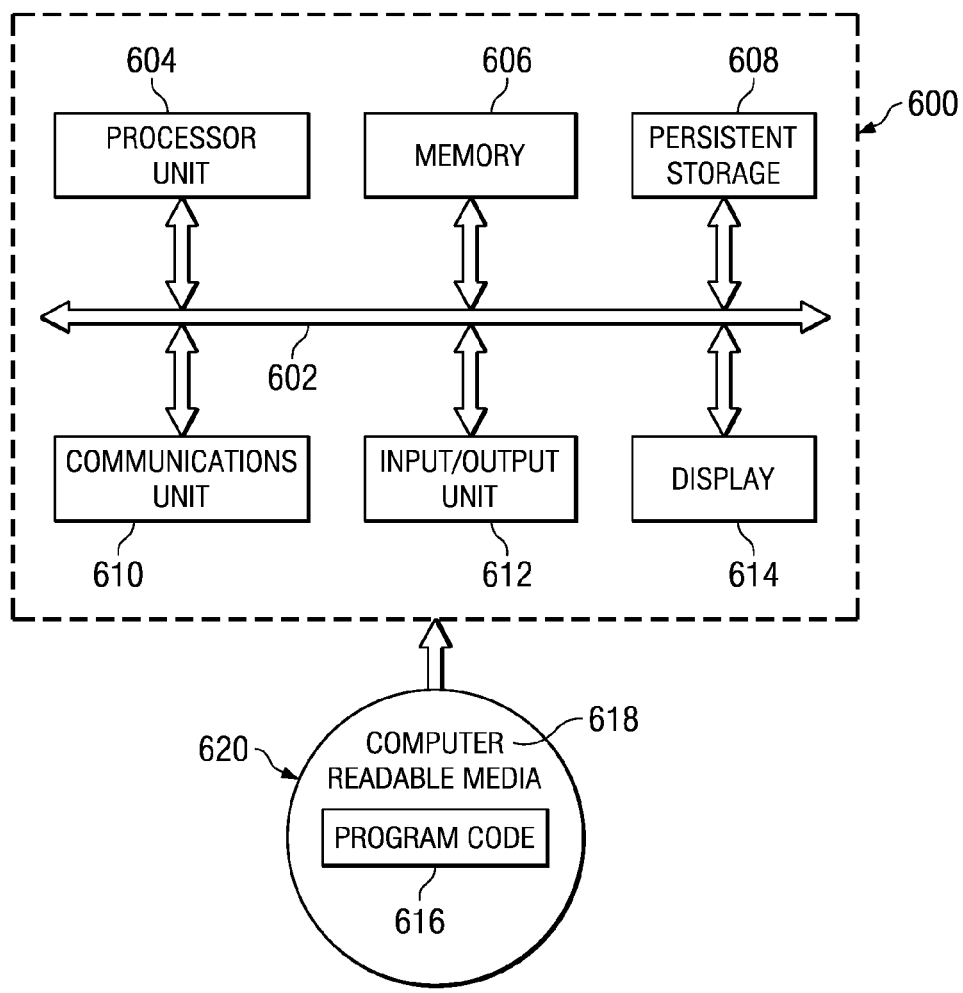
FIG. 6 is a diagram of a controller in accordance with an advantageous embodiment.

Turning now to FIG. 6, a diagram of a controller is depicted in accordance with an advantageous embodiment. In this advantageous embodiment, controller 600 is an example of one implementation of controller 306 in FIG. 3, and may, for example and without limitation, be incorporated in a PC or laptop computer. In this example, controller 600 includes communications fabric 602, which provides communications between processor unit 604, memory 606, persistent storage 608, communications unit 610, input/output (I/O) unit 612, and display 614.

Processor unit 604 serves to execute instructions for software that may be loaded into memory 606. Processor unit 604 may be a set of one or more processors or may be a multi-processor core, depending on the particular implementation.

Memory 606 and persistent storage 608 are examples of storage devices. A storage device is any piece of hardware that is capable of storing information either on a temporary basis and/or a permanent basis. Memory 606, in these examples, may be, for example and without limitation, a random access memory or any other suitable volatile or non-volatile storage device. Persistent storage 608 may take various forms depending on the particular implementation.

For example, persistent storage 608 may contain one or more components or devices. For example and without limitation, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples and without limitation, provides for communications with other data processing systems or devices. In these examples, communications unit 610 is a network interface card. Communications unit 610 may provide communications through the use of either or both physical and wireless communications links.

Input/output unit 612 allows for input and output of data with other devices that may be connected to controller 600. For example and without limitation, input/output unit 612 may provide a connection for user input through a keyboard and mouse. Further, input/output unit 612 may send output to a printer. Display 614 provides a mechanism to display information to a user.

Instructions for the operating system and applications or programs may be located on persistent storage 608. These instructions may be loaded into memory 606 for execution by processor unit 604. The processes of the different embodiments may be performed by processor unit 604 using computer implemented instructions, which may be located in a memory, such as memory 606. These instructions are referred to as program code, computer usable program code, or computer readable program code that may be read and executed by a processor in processor unit 604. The program code in the different embodiments may be embodied on different physical or tangible computer readable media, such as memory 606 or persistent storage 608.

Program code 616 may be located in a functional form on computer readable media 618 that may be selectively removable and that may be loaded onto or transferred to controller 600 for execution by processor unit 604. In these examples, program code 616 is an example of software which may be used to create surface area map 342, CAD file 344, NC path 346 and translated NC path 348 in FIG. 3.

Program code 616 and computer readable media 618 form computer program product 620 in these examples. In one example and without limitation, computer readable media 618 may be in a tangible form, such as, for example, an optical or magnetic disc that is inserted or placed into a drive or other device that is part of persistent storage 608 for transfer onto a storage device, such as a hard drive that is part of persistent storage 608.

In a tangible form, computer readable media 618 also may take the form of a persistent storage, such as a hard drive, a thumb drive, or a flash memory that is connected to controller 600. The tangible form of computer readable media 618 is also referred to as computer recordable storage media. In some instances, computer readable media 618 may not be removable.

Alternatively, program code 616 may be transferred to controller 600 from computer readable media 618 through a communications link to communications unit 610 and/or through a connection to input/output unit 612. The communications link and/or the connection may be physical or wireless in the illustrative examples. The computer readable media also may take the form of non-tangible media, such as communications links or wireless transmissions containing the program code.

The different components illustrated for controller 600 are not meant to provide architectural limitations to the manner in which different embodiments may be implemented. The different illustrative embodiments may be implemented in a data processing system including components in addition to or in place of those illustrated for controller 600. Other components shown in FIG. 6 can be varied from the illustrative examples shown.

Figure 7:
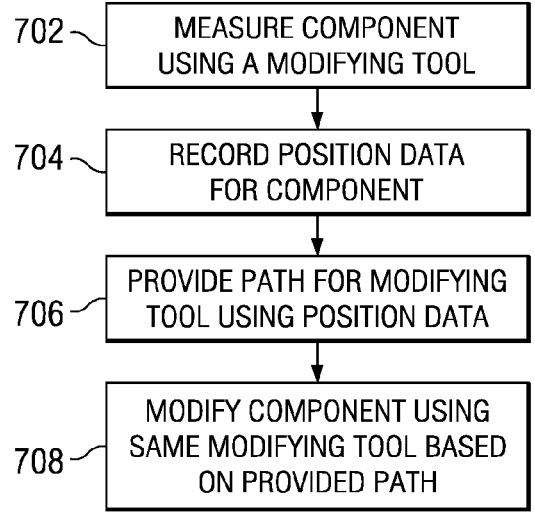
FIG. 7 is a flowchart of a process for modifying a component in accordance with an advantageous embodiment.

With reference now to FIG. 7, a flowchart of a process for modifying a component is depicted in accordance with an advantageous embodiment. The process is generally designated by reference number 700, and may begin by measuring the component using a modifying tool (operation 702). Position data for the component may be recorded based on the measuring (operation 704), and a path for the modifying tool may be provided using the position data, for example and without limitation, by creating a numerically created path for the modifying tool (operation 706). The component may be modified by moving the same modifying tool based on the provided path (operation 708).

Figure 8:
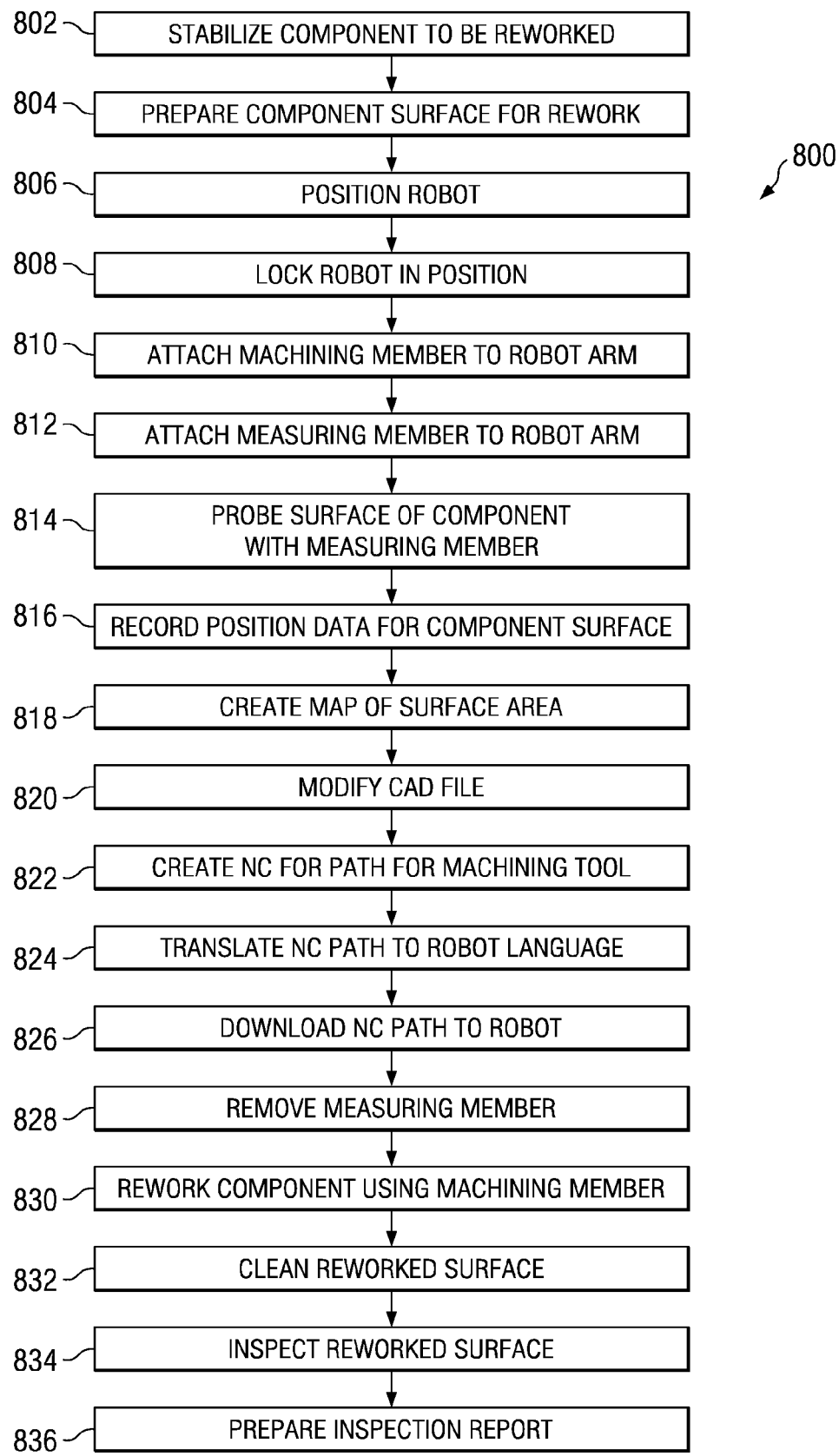
FIG. 8 is a flowchart of a process for modifying a surface of a component in accordance with an advantageous embodiment.

With reference now to FIG. 8, a flowchart of a process for modifying a surface of a component is depicted in accordance with an advantageous embodiment. The process is generally designated by reference number 800, and, in the advantageous embodiment illustrated in FIG. 8, may be a process for reworking a surface of a component, such as an aircraft component formed of composite material. Process 300 may begin by stabilizing a component to be reworked (operation 802). Stabilization may be accomplished, for example, by mounting the component so as to minimize flexure movement and vibration of the component. A surface of the component to be reworked may then be prepared for the rework process (operation 804). For example and without limitation, any material that may inhibit rework operations may be removed from the surface.

A reworking tool may then be positioned to perform the rework (operation 806). In one advantageous embodiment, the rework tool may be a robot, for example and without limitation, robot 302 in FIG. 3 or robot 400 in FIG. 4, and the positioning may position the robot adjacent to or on the component to be reworked, for example and without limitation, component 304 in FIG. 3 or component 406 in FIGS. 4, 5A and 5B, to ensure full access of the robot to an area of the surface of the component to be reworked. The robot 302 or 400 may then be locked in position with respect to the component 304 or 406 to be reworked to prevent relative movement between the robot 302 or 400 and the component 304 or 406 (operation 808). For example, the robot may be locked in a self-supported position adjacent to the component or it may be mounted directly to the component by suction cups or other mounting mechanisms.

A machining member or tool, for example and without limitation, machining tool 314 in FIG. 3 or machining tool 412 in FIGS. 4, 5A and 5B, may then be attached to an arm of the robot (operation 810), and a measuring member or tool, for example and without limitation, measuring tool 312 in FIG. 3 or measuring tool 410 in FIGS. 4, 5A and 5B, may also be mounted to the arm of the robot (operation 812). In an advantageous embodiment, the measuring member may comprise a measuring sleeve, for example and without limitation, sleeve 330 in FIG. 3, mounted to surround the machining member during a measuring process, and then removed to expose the machining member for a machining process. In an advantageous embodiment, the sleeve has a hemisphere-shaped contact tip, for example and without limitation, contact tip 332 in FIG. 3 or contact tip 422 in FIGS. 4 and 5A, and may be mounted to the robot arm in such a manner that a contact tip of the machining member, for example and without limitation, contact tip 336 in FIG. 3 or contact tip 514 in FIGS. 5A and 5B, is at the focus of the hemisphere so as to relate the contact tip 332 or 422 of the sleeve 330 of the measuring tool 312 or 410 to the contact tip 336 or 514 of the machining tool 314 or 412.

A surface of the component to be reworked may then be measured with the measuring member using force controlled motion of the measuring member (operation 814). As the measuring member is moved over the component surface, position data for the surface, for example and without limitation, position data 338 in FIG. 3, is recorded (operation 816). In an advantageous embodiment, the position of the measuring tool is recorded at programmed intervals, for example and without limitation, after approximately every 5 mm of absolute movement. A map, for example and without limitation, map 342 in FIG. 3, of the surface area being measured (and to be reworked) may be created using the position data (operation 818), and the map may be used to modify a CAD file, for example and without limitation, CAD file 344 in FIG. 3, based on the map (operation 820). A numerically controlled (NC) path for the machining tool, for example and without limitation, NC path 346 in FIG. 3, may then be created (operation 822), the created NC path may be translated to machine language (operation 824), and the translated NC path, for example and without limitation, translated NC path 348 in FIG. 3, may be downloaded to the robot, for example and without limitation, downloaded NC path 350 in FIG. 3 (operation 826).

The measuring member may then be removed from the robot arm to expose the machining member (operation 828), and the component surface may be reworked by moving the machining member based on the downloaded NC path (operation 830). In this regard, it should be recognized that in reworking the component surface, the contact tip of the machining tool may be locatable below the measured surface of the component to accomplish the rework operation.

Following rework of the component surface, the reworked surface may be cleaned (operation 832) and inspected (operation 834). An inspection report may be prepared to enable approval of the rework operation such that subsequent operations may then be performed on the reworked surface, for example and without limitation, applying a repair patch or the like, or to specify any necessary additional rework actions that should be performed (operation 836).

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for modifying a component, comprising:
    measuring the component using a modifying tool wherein the modifying tool comprises an arm;
    recording position data for the component based on the measuring;
    providing a path for the modifying tool using the position data;
    modifying the component by moving the same modifying tool based on the provided path;
    wherein the measuring further comprises measuring a surface of the component with a measuring tool attached to the arm of the measuring tool, and wherein modifying the component using the same modifying tool based on the provided path, comprises modifying the surface of the component with a machining tool also attached to the arm of the modifying tool;
    wherein the measuring tool surrounds the machining tool during the measuring; and
    removing the measuring tool from the arm during a modifying step.

2. The method according to claim 1, wherein measuring the component using a modifying tool comprises:
    measuring the component using force controlled motion of the modifying tool.

3. The method according to claim 1, wherein providing a path for the modifying tool using the position data, comprises:
    providing a map of the component from the recorded position data;
    modifying a CAD file using the map; and
    creating a numerically controlled path for the modifying tool based on the CAD file.

4. The method according to claim 3, and further comprising:
    downloading the numerically controlled path to the modifying tool, wherein modifying the component by moving the same modifying tool based on the provided path, comprises:
    modifying the component by moving the same modifying tool based on downloaded numerically controlled path.

5. The method according to claim 1, wherein the modifying tool comprises a robot.

6. The method according to claim 1, and further comprising positioning a contact tip of the measuring tool at a fixed position with respect to a contact tip of the machining tool when the measuring tool surrounds the machining tool.

7. The method according to claim 1, wherein the component comprises a component formed of composite material, and wherein the modifying comprises reworking a surface of the component.

8. The method according to claim 7, wherein the component comprises a component of an aircraft.

9. A method for modifying a surface of a component formed of composite material, comprising:
    measuring a surface of a component to be modified using a modifying tool;
        wherein the modifying tool comprises an arm; a measuring member sleeve for measuring the component; and a machining member for modifying the component;
    positioning the measuring member sleeve so as to surround the machining member for measuring;
    removing the measuring member sleeve from the machining member for modifying operations;
    recording position data for the surface of the component based on the measuring;
    providing a path for the modifying tool using the position data; and
    modifying the surface of the component by moving the same modifying tool based on the provided path.

10. The method according to claim 9, wherein measuring a surface of a component to be modified using a modifying tool comprises:

measuring the surface of the component using force controlled motion of the modifying tool.

11. The method according to claim 9, wherein the modifying comprises performing a scarfing operation on the surface of the component.

12. The method according to claim 9, wherein the component comprises an aircraft component.

13. An apparatus for modifying a component, the apparatus comprising:
- a modifying tool for measuring and modifying the component comprising:
  - an arm;
  - a measuring member for measuring the component; and
  - a machining member for modifying the component;
  - wherein the measuring member and the machining member are attached to the arm of the modifying tool:
  - wherein the measuring member surrounds the machining member during measuring the component, and wherein the measuring member is removed from the arm to expose the machining member during modifying the component;
- a controller for providing a path for the modifying tool to modify the component based on the measuring; and
- a driver for moving the same modifying tool along the provided path for modifying the component.

14. The apparatus according to claim 13, wherein the modifying tool comprises a robot.

15. The apparatus according to claim 13, wherein a contact tip of the measuring member is positioned at a fixed position with respect to a contact tip of the machining member when the measuring member surrounds the machining member.

16. The apparatus according to claim 15, wherein the contact tip of the measuring member comprises a hemisphere-shaped contact tip.

17. The apparatus according to claim 13, wherein the component comprises a component formed of composite material, and wherein the machining member comprises a scarfing tool.

18. A computer program product, comprising:
- a non-transitory computer recordable medium storing computer usable program code for modifying a component, the computer program product comprising:
- computer usable program code for measuring the component using a modifying tool;
  - wherein the modifying tool comprises an arm; a machining member for modifying the component; a measuring member sleeve surrounding the machining member while measuring the component; and
  - wherein the measuring member sleeve is removed for modifying the component;
- computer usable program code for recording position data for the component based on the measuring;
- computer usable program code for providing a path for the modifying tool using the position data; and
- computer usable program code for modifying the component by moving the same modifying tool based on the provided path.

19. The computer program product according to claim 18, wherein the computer usable program code for measuring the component using a modifying tool comprises:
- computer usable program code for measuring the component using force controlled motion of the modifying tool.

20. The computer program product according to claim 18, wherein the computer usable program code for providing a path for the modifying tool using the position data, comprises:
- computer usable program code for providing a map of the component from the recorded position data;
- computer usable program code for modifying a CAD file using the map; and
- computer usable program code for creating a numerically controlled path for the modifying tool based on the CAD file.

21. An apparatus for modifying a component, the apparatus comprising:
- a robot having a robot arm;
- a measuring tool on the robot arm for measuring a surface of the component to provide surface measurements;
- a machining tool on the robot arm for machining the surface of the component;
- a controller for receiving the surface measurements and for providing a path for the machining tool to modify the component based on the surface measurements; and
- a robot driver for moving the machining tool on the provided path for modifying the component, wherein the measuring tool comprises a sleeve that surrounds the machining tool during measuring of the surface of the component, wherein the sleeve is configured to be removably attached to the machining tool, and which has a contact tip positioned at a fixed position with respect to a contact tip of the machining tool when the measuring tool surrounds the machining tool, and wherein the measuring tool is removed from the robot arm to expose the machining tool during modifying of the component.

22. The apparatus of claim 21 wherein the sleeve comprises a hemisphere-shaped contact tip.

23. The apparatus of claim 22 wherein the hemisphere-shaped contact tip is characterized by a focus and wherein the focus is positioned on the machining tool.

* * * * *